US012015422B1

(12) United States Patent
Farrell et al.

(10) Patent No.: US 12,015,422 B1
(45) Date of Patent: Jun. 18, 2024

(54) DATA INTEGRITY CHECKING BETWEEN CIRCUITS

(71) Applicant: GM GLOBAL TECHNOLOGY OPERATIONS LLC, Detroit, MI (US)

(72) Inventors: Brian Farrell, Troy, MI (US); Thomas M. Forest, Macomb, MI (US); Karl B. Leboeuf, LaSalle (CA); Kenneth William Junk, Marshalltown, IA (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 18/173,986

(22) Filed: Feb. 24, 2023

(51) Int. Cl.
*H03M 13/09* (2006.01)
*H04L 1/00* (2006.01)
*H04L 9/08* (2006.01)

(52) U.S. Cl.
CPC .......... *H03M 13/09* (2013.01); *H04L 1/0041* (2013.01); *H04L 9/0869* (2013.01); *H04L 2209/16* (2013.01)

(58) Field of Classification Search
CPC ... H04L 1/0041; H04L 1/0061; H04L 1/0075; H04L 9/0869; H04L 2209/16; H03M 13/09
See application file for complete search history.

(56) References Cited

U.S. PATENT DOCUMENTS

2020/0213096 A1* 7/2020 Fernandez ................ H04L 9/16
2022/0393855 A1* 12/2022 Fernandez ............ H04L 9/0662

* cited by examiner

*Primary Examiner* — Shelly A Chase
(74) *Attorney, Agent, or Firm* — Quinn IP Law

(57) ABSTRACT

An apparatus has a communication bus, a first circuit, and a second circuit. The first circuit is operational to generate a package, calculate a check value of payload data in the package with a particular cyclic redundancy check variant and an obfuscation type, store an encrypted check value in a footer of the package, store an encrypted obfuscation code in a header of the package, and transmit the package on the communication bus. The second circuit is operational to receive the package from the communication bus, decrypt the encrypted check value to determine the check value calculated by the first circuit, determine an obfuscation type from the encrypted obfuscation code, perform a payload verification of the payload data with the particular cyclic redundancy check variant with the obfuscation type applied and the check value, and signal that the payload data is valid in response to passage of the payload verification.

20 Claims, 5 Drawing Sheets

DATA INTEGRITY CHECKING BETWEEN CIRCUITS

INTRODUCTION

The present disclosure relates to a system and a method for data integrity checking between circuits.

Inside electronic units, data is sent from one cartridge to another cartridge over a backplane bus. Interfaces between the cartridges and the backplane are easily accessible since the cartridges are expected to be replaceable by end customers. The bus hardware usually does not support integrity and data encryption hardware to perform inline authentication of the data traversing the bus. Due to performance constraints, the bus hardware is not expected to protect entire packet payloads with a message authentication code. As such, a bad actor may intentionally modify the data in transit in a way that the receiving cartridge fails to recognize the modification. Where the data is important, the undetected modifications may cause a variety of problems.

Accordingly, those skilled in the art continue with research and development efforts in the field of detecting intentional data modifications between transmitters and receivers.

SUMMARY

An apparatus is provided herein. The apparatus includes a communication bus, a first circuit, and a second circuit. The first circuit is coupled to the communication bus, and operational to: generate a package that includes a header, payload data, and a footer; and calculate a check value of the payload data with a particular cyclic redundancy check variant and an obfuscation type. The obfuscation type is one or more of (i) a random selection of the particular cyclic redundancy check variant from among a plurality of cyclic redundancy check variants, (ii) a random start point in the payload data for the calculation, (iii) the calculation of the check value is performed over a nonsequential path through the payload data, (iv) incorporate a random number into the calculation of the check value, and (v) calculate the check value with two or more particular cyclic redundancy check variants each working on a respective subset of the payload data. The first circuit is further operational to: generate an encrypted check value from the check value; store the encrypted check value in the footer of the package; generate an encrypted obfuscation code for the obfuscation type; store the encrypted obfuscation code in the header of the package; and transmit the package on the communication bus. The second circuit is coupled to the communication bus, and operational to: receive the package from the communication bus; extract the payload data, the encrypted check value, and the encrypted obfuscation code from the package; decrypt the encrypted check value to determine the check value calculated by the first circuit; determine the obfuscation type from the encrypted obfuscation code; perform a payload verification of the payload data with the particular cyclic redundancy check variant with the obfuscation type applied and the check value; and signal that the payload data is valid in response to passage of the payload verification.

In one or more embodiments of the apparatus, the obfuscation type includes (i) a random selection of the particular cyclic redundancy check variant from among a plurality of cyclic redundancy check variants, (ii) a random start point in the payload data for the calculation, (iii) the calculation of the check value is performed over a nonsequential path through the payload data, (iv) incorporate a random number into the calculation of the check value, and (v) calculate the check value with two or more particular cyclic redundancy check variants each working on a respective subset of the payload data.

In one or more embodiments of the apparatus, the obfuscation type is the random selection of the particular cyclic redundancy check variant; the first circuit is operational to encrypt the particular cyclic redundancy check variant to generate an encrypted cyclic redundancy check variant; the encrypted obfuscation code indicates the encrypted cyclic redundancy check variant; and the second circuit is operational to decrypt the encrypted cyclic redundancy check variant to determine the particular cyclic redundancy check variant selected by the first circuit.

In one or more embodiments of the apparatus, the obfuscation type is the random selection of the particular cyclic redundancy check variant; the encrypted obfuscation code includes a check identifier of the particular cyclic redundancy check variant; and the second circuit uniquely associates the check identifier with the particular cyclic redundancy check variant from among a plurality of cyclic redundancy check variants.

In one or more embodiments of the apparatus, the obfuscation type is the random start point in the payload data for the calculation; the first circuit is operational to encrypt the random start point to generate an encrypted random start point; the encrypted obfuscation code includes the encrypted random start point; the second circuit is operational to decrypt the encrypted random start point to determine the random start point used by the first circuit; and the payload verification is based on the random start point.

In one or more embodiments of the apparatus, the obfuscation type is the random start point in the payload data for the calculation; the first circuit is operational to determine the random start point based on a seed value; the encrypted obfuscation code includes the seed value; the second circuit is operational to calculate the random start point from the seed value; the payload verification is based on the random start point; and the seed value is known to the first circuit and the second circuit.

In one or more embodiments of the apparatus, the obfuscation type is the calculation of the check value performed over the nonsequential path through the payload data; the payload data is logically formed from a first number of segments; each of the first number of segments is logically formed from a second number of chunks; the nonsequential path jumps among the first number of segments and the second number of chunks in a pattern; the encrypted obfuscation code includes the random start point, the first number of segments, and the second number of chunks; the second circuit is operational to determine the first number of segments, and the second number of chunks from the encrypted obfuscation code; the payload verification is based on the first number of segments and the second number of chunks. The pattern in known to the first circuit and the second circuit.

In one or more embodiments of the apparatus, the obfuscation type is the calculation of the check value performed over the nonsequential path through the payload data; the first circuit is operational to: randomly determine an interval; encrypt the interval to generate an encrypted interval; and store the encrypted interval in the header, wherein the nonsequential path through the payload data used by the particular cyclic redundancy check variant in the first circuit skips through the payload data at the interval; and the second circuit is operational to: extract the encrypted interval from the package; decrypt the encrypted interval to determine the interval used by the first circuit; perform the payload verification of the payload data with the particular cyclic redundancy check variant, the check value, and the interval; and the payload verification is based on the interval.

In one or more embodiments of the apparatus, the obfuscation type is by incorporation of a random number into the calculation of the check value; the first circuit is operational to: generate the random number; store the random number in the package; and the second circuit is operational to: extract the random number from the package; and perform the payload verification of the payload data with the particular cyclic redundancy check variant, the check value, and the random number.

In one or more embodiments of the apparatus, the obfuscation type is to calculate the check value with two or more particular cyclic redundance check variants each working on a respective subset of the payload data; the first circuit is operational to: determine the two or more particular cyclic redundance check variants from among the plurality of cyclic redundance check variants; parse the payload data into two or more subsets; calculate two or more intermediate check values, each based on one of the two or more particular cyclic redundancy check variants working on the respective subset of the payload data; and append the two or more intermediate check values to form the check value; and the second circuit is operational to: parse the payload data into the two or more subsets; parse the check value into the two or more intermediate check values; and perform the payload verification of the payload data with the two or more particular cyclic redundancy check variants and the two or more intermediate check values.

In one or more embodiments of the apparatus, the first circuit is operational to: store an anti-replay counter value, a message identifier value, a message length value, and a type of data protection in the header; generate a message authentication code based on the header and the encrypted check value in the footer; and store the message authentication code in the footer; and the second circuit is operational to: extract the message authentication code from the package; perform a package verification of the package with the message authentication code; and signal that the package is valid in response to passage of the package verification.

In one or more embodiments, the apparatus includes a vehicle; and an electronic control unit inside the vehicle, wherein the communication bus is a peripheral component interconnect express bus inside the electronic control unit.

In one or more embodiments of the apparatus, the first circuit is operational to: logically partition the payload data into protected data and unprotected data; generate a message authentication code based on the header, the protected data, and an encrypted check value in the footer, wherein the message authentication code is generated independent of the unprotected data; and store the message authentication code in the footer; and the second circuit is operational to: extract the message authentication code from the package; perform a package verification of the header, the protected data, and an encrypted check value with the message authentication code; and signal that the package is valid in response to passage of the package verification.

An apparatus is provided herein. The apparatus includes a communication bus, a first circuit, and a second circuit. The first circuit is coupled to the communication bus, and operational to: generate a package that includes a header, payload data, and a footer; logically partition the payload data into protected data and unprotected data; generate a message authentication code based on the header, the protected data, and an encrypted check value in the footer, wherein the message authentication code is generated independent of the unprotected data; store the message authentication code in the footer; transmit the package on the communication bus. The second circuit is coupled to the communication bus, and operational to: receive the package from the communication bus; extract the message authentication code from the package; perform a package verification of the header, the protected data, and an encrypted check value with the message authentication code; and signal that the package is valid in response to passage of the package verification.

In one or more embodiments of the apparatus, the first circuit is operational to: increment an anti-replay counter value in response to each of a plurality of transmissions to the communication bus; generate a pseudo random value based on the anti-replay counter value and a seed value, wherein the logical partition of the payload data is based on the pseudo random value, and a particular cyclic redundancy check variant of a plurality of redundancy check variants is selected based on the pseudo random value; calculate a protected check value of the protected data with the particular cyclic redundancy check variant; encrypt the protected check value to generate an encrypted protected check value; and store the anti-replay counter value and the encrypted protected check value in the header of the package. The second circuit is operational to: extract the anti-replay counter value and the encrypted protected check value from the header; decrypt the encrypted protected check value to determine the protected check value calculated by the first circuit; generate the pseudo random value used in the first circuit based on the anti-replay counter value and the seed value; determine the particular cyclic redundancy check variant used by the first circuit based on the pseudo random value; perform a payload verification of the protected data with the particular cyclic redundancy check variant and the protected check value; and signal that the payload data is valid in response to passage of the payload verification. The seed value is known to the first circuit and the second circuit.

In one or more embodiments of the apparatus, the first circuit is operational to: calculate a check value of the payload data with a particular cyclic redundancy check variant; encrypt the check value to generate an encrypted check value; and store the encrypted check value in the package. The second circuit is operational to: perform an unprotected cyclic redundance check of the package at a link layer level of the communications bus; extract the encrypted check value from the package in response to passage of the unprotected cyclic redundance check at the link layer level; decrypt the encrypted check value to determine the check value; perform a payload verification of the payload data with the particular cyclic redundancy check variant and the check value; and signal corruption in the payload data in response to failure of the payload verification.

In one or more embodiments of the apparatus, the second circuit is operational to: perform an unprotected cyclic redundance check of the package at a link layer level of the communications bus. The extraction of the message authentication code from the package is in response to passage of the unprotected cyclic redundance check at the link layer level. The second circuit is further operational to signal corruption in the package in response to failure of the package verification.

In one or more embodiments of the apparatus, the first circuit is operational to: randomly select a particular cyclic redundancy check variant from among a plurality of cyclic redundancy check variants; store an identification of the particular cyclic redundancy check variant in the header of the package; calculate a check value of the payload data with the particular cyclic redundancy check variant; encrypt the check value to generate an encrypted check value; and store the encrypted check value in the footer of the package. The second circuit is operational to: extract the encrypted check value and the identification of the particular cyclic redundance check variant from the package; decrypt the encrypted check value to generate the check value; perform a first payload verification of the payload data with the particular cyclic redundancy check variant and the check value; select an additional cyclic redundancy check variant from the plurality of cyclic redundancy check variants in response to failure of the first payload verification; perform a second payload verification of the payload data with the additional cyclic redundancy check variant and the check value; and signal a compromise of the payload data in response to passage of the second payload verification.

A method for data integrity checking between circuits is provided herein. The method includes generating a package with a first circuit. The package includes a header, payload data, and a footer. The method further includes: selecting a particular cyclic redundancy check variant at random from a plurality of cyclic redundancy check variants; storing a check identifier of the particular cyclic redundancy check variant in the header of the package; calculating a check value of the payload data with the particular cyclic redundance check variant; encrypting the check value to generate an encrypted check value; storing the encrypted check value in the footer of the package; partitioning logically the payload data into protected data and unprotected data; and generating a message authentication code based on the header, the protected data, and the encrypted check value in the footer. The message authentication code is generated independent of the unprotected data. The method includes: storing the message authentication code in the footer; transmitting the package on a communication bus from the first circuit; receiving the package at a second circuit from the communication bus; extracting the payload data, the encrypted check value, the check identifier, and the message authentication code from the package; determining the particular cyclic redundant check variant used in the first circuit with the check identifier; decrypting the encrypted check value to determine the check value calculated by the first circuit; performing a payload verification of the payload data in the second circuit with the particular cyclic redundancy check variant and the check value; signaling that the payload data is valid in response to passage of the payload verification; performing a package verification of the header, the protected data, and an encrypted check value in the second circuit with the message authentication code; and signaling that the package is valid in response to passage of the package verification.

In one or more embodiments of the method, the partitioning of the payload data is based on an inter-circuit communications performance criterion of the package.

The above features and advantages and other features and advantages of the present disclosure are readily apparent from the following detailed description of the best modes for carrying out the disclosure when taken in connection with the accompanying drawings.
i.

DETAILED DESCRIPTION

Embodiments of the present disclosure generally provide a system and/or method for rapidly obscuring payload data within packets communicated between circuits on a communication bus. The communication rates are sometimes too high to authenticate the entire payload data through typical methods. Instead, the system/method provide a combination of configurable techniques that allow for the payload data to be protected as much as possible based on throughput criteria. The techniques include obfuscation of cyclic redundant checks (CRC) and/or shortening the generation of cryptographic Message Authentication Codes (MAC) on a transmit side of the communication bus, and complementary packet verification and/or payload data verification on the receiving side.

The obfuscation type may include one or more of (i) a random selection of the particular cyclic redundancy check variant from among multiple cyclic redundancy check variants, (ii) a random start point in the payload data for the CRC calculation, (iii) performing the CRC calculation over a nonsequential path through the payload data, (iv) incorporate a random number into the CRC calculation of the check value, and (v) calculate the check value with two or more particular cyclic redundance check variants each working on a respective subset of the payload data. Generation of the message authentication codes may be shortened by using a subset of the payload data for the calculations. Each obfuscation type may be implemented stand-alone or in combination with two or more of the obfuscation types for improved data integrity checking.

Figure 1:
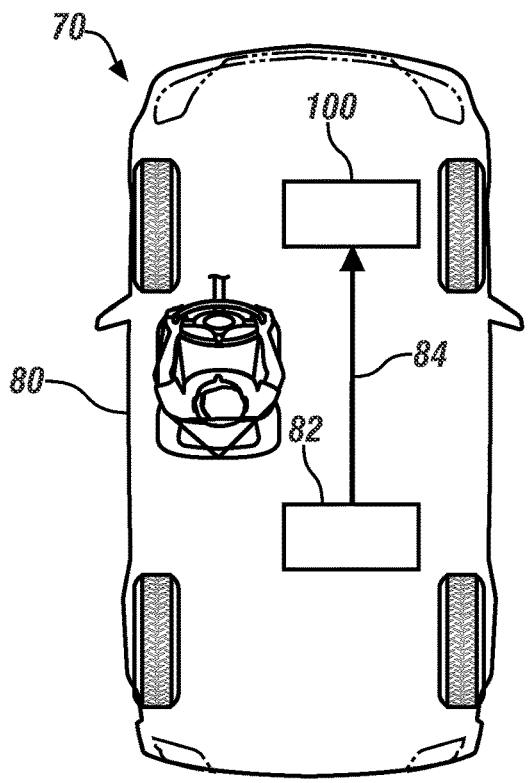
FIG. 1 is a schematic plan diagram illustrating a context of an apparatus in accordance with one or more exemplary embodiments.

Referring to FIG. 1, a schematic plan diagram illustrating a context of an apparatus 70 is shown in accordance with one or more exemplary embodiments. The apparatus 70 includes a vehicle 80 with one or more sensors 82 (one shown) and one or more electronic control units 100 (one shown).

The vehicle 80 implements as an automobile (or car). In various embodiments, the vehicle 80 may include, but is not limited to, a passenger vehicle, a truck, an autonomous vehicle, a gas-powered vehicle, an electric-powered vehicle, a hybrid vehicle and/or a motorcycle. Other types of vehicles 80 may be implemented to meet the design criteria of a particular application.

Each sensor 82 implements a sensing device. The sensor 82 generates a sensed signal 84 that is transferred to the electronic control unit 100. The sensors 82 may include, but are not limited to, a temperature sensor, an acoustic sensor, a vibration sensor, an accelerometer, a camera, and a radar. Other types of sensors may be implemented to meet the design criteria of a particular application.

The electronic control unit (ECU) 100 implements multiple digital computation circuits. The digital computation circuits may transfer data with one another across a communications bus. The digital computation circuits may be implemented in hardware, software executing on hardware, or a combination of both. The sensed signal 84 may be received by the ECU 100.

Figure 2:
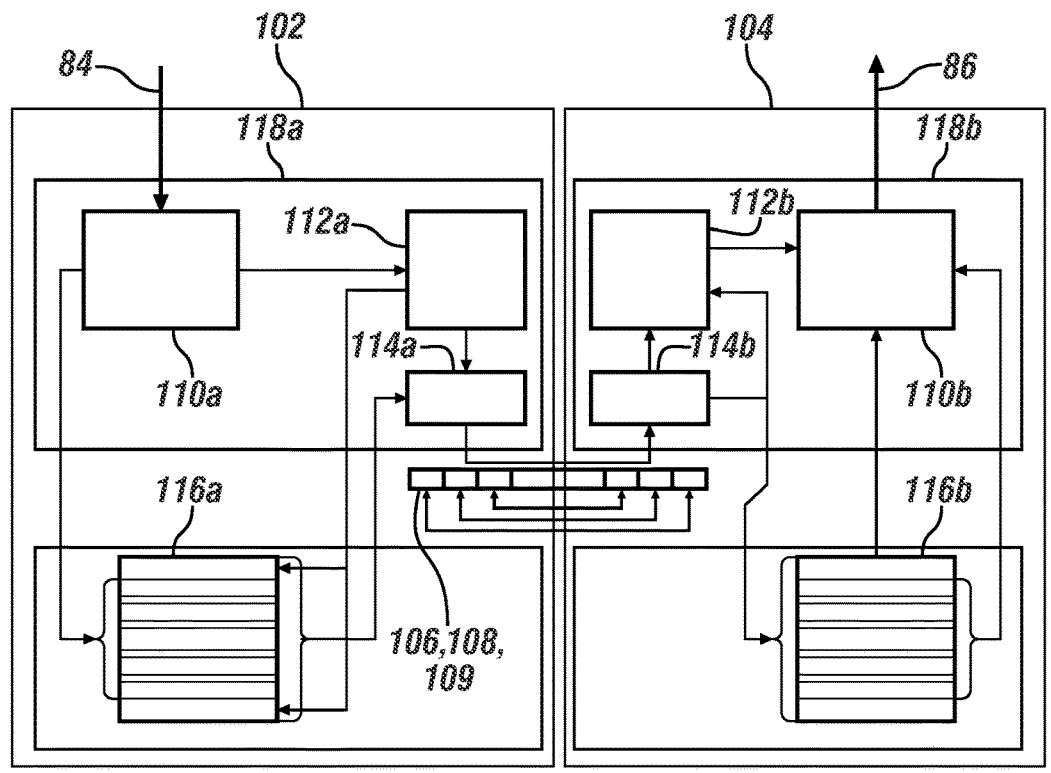
FIG. 2 is a schematic diagram of an electronic control unit in accordance with one or more exemplary embodiments.

Referring to FIG. 2, a schematic diagram of an example implementation of an electronic control unit 100 is shown in accordance with one or more exemplary embodiments. The ECU 100 generally includes a first circuit 102, a second circuit 104, and a backplane 106. One of the circuits (e.g., the first circuit 102) may receive the sensed signal 84. The other circuit (e.g., the second circuit 104) may generate an output signal 86. The output signal 86 may convey information if packages transferred from the first circuit 102 to the second circuit 104 are valid, corrupted and/or compromised.

The first circuit 102 includes a first processing module 110a, a first communication library circuit 112a, a first bus interface circuit 114a, and a first memory device 116a. The second circuit 104 includes a second processing module 110b, a second communication library circuit 112b, a second bus interface circuit 114b, and a second memory device 116b. In some embodiments, the first processing module 110a, the first communication library circuit 112a, and the first bus interface circuit 114a are implemented as a system-on-a-chip 118a. Likewise, the second processing module 110b, the second communication library circuit 112b, and the second bus interface circuit 114b may be implemented as another system-on-a-chip 118b. The first circuit 102 and the second circuit 104 are coupled to the backplane 106.

The first circuit 102 and the second circuit 104 each include processing resources, tangible, non-transitory memory (e.g., read-only memory in the form of optical, magnetic, and/or flash memory). For example, the first circuit 102 and the second circuit 104 may include application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the first circuit 102 and/or the second circuit 104 (either in the foreground or background). The first circuit 102 and/or the second circuit 104 may receive commands and information, in the form of one or more input signals from various controls and/or components in the vehicle 80, and communicate instructions to the other electronic components.

Each processing module 110a-110b implements one or more processors. The processing modules 110a-110b may be operational to execute instructions (e.g., software or code). The computer-readable and executable instructions embodying the present method may be recorded (or stored) in the memory and executed as set forth herein. The executable instructions may be a series of instructions employed to run applications on the circuits 102-104 (either in the foreground or background). The processing modules 110a-110b may receive commands and information, in the form of one or more input signals from various controls or components in the vehicle 80, such as the sensor 82, and communicate instructions to the other electronic components.

Each communication library circuit 112a-112b implements a nonvolatile memory block. The communication library circuits 112a-112b are operational to store chip-to-chip (C2C) transfer information, including message identifications (ID), transmitter ID, receiver ID, payload information, start addresses, CRC variant, protection information, and the like. In various embodiments, the communication library circuits 112a-112b include replay-protected memory blocks (RPMB).

Each communication library circuit 112a-112b holds a table protected from modification that indicates a level of importance for the messages (e.g., packets) based on the transmitter identification/message identification parameters. Important messages (identified by the Transmitter ID/Message ID within the security header of the message) are discarded at the receiver end in the absence of a valid MAC protecting a header of the packet. The MAC ensures that an illegitimate device does not transmit an important message with the protections disabled.

Each bus interface circuit 114a-114b implements a communication protocol that enables the first circuit 102 and the second circuit 104 to exchange data with each other via the backplane 106. In various embodiments, the communication protocol may be a Peripheral Component Interconnect Express (PCIe) protocol, Other communication protocols may be implemented to meet the design criteria of a particular application.

Each memory device 116a-116b implement a memory block. The memory devices 116a-116b are operational to buffer packets and other information. In various embodiments, the memory devices 116a-116b may be double data rate (DDR) memory devices. Other types of memory devices may be implemented to meet the design criteria of a particular application.

The backplane 106 implements power busses, signal busses, and a communication bus 108. In various embodiments, the communication bus 108 may implement a PCIe bus 109. Other communication busses may be implemented to meet a design criteria of a particular application.

Each circuit 102-104 communicating important data with other circuits 102-104 over backplane 106 may have a shared key provisioned. The key may be common to the circuits 102-104 and is generally provisioned as M1-M3 SHE (Secure Hardware Extensions) memory update protocol messages. The keys are provisioned with MAC-generate privileges to enable each circuit 102-104 to generate a shared session key based on a transmitted anti-rollback count. In various embodiments, the key is provisioned with Secure Onboard Communication (SecOC) keys.

At startup of the vehicle 80 (e.g., a new ignition cycle) the communication library circuit 112a or 112b at a transmitter side increments an Anti-Replay Count High component that is stored in RPMB flash memory. The transmitter-side communication library circuit 112a or 112b solely stores Anti-Replay Count High component in the flash memory at beginning of a session. Several (e.g., eight) bytes ensures that the Anti-Replay Counter does not rollover (e.g., allows for 1 reset per microsecond for approximately 9000 years). The Anti-Replay Count generally prevents replay of previously recorded messages. Each message has an associated counter value, and the counter value in the transmission side increments for each message transmission. Therefore, a receiver solely accepts new messages with new (e.g., higher) counter values and rejects old messages with old (e.g., lower) counter values. For example, if a current counter value in the receiver is 7 and a message is received with a counter value of 3, the message would be rejected.

At startup, an Anti-Replay Count Low component is set to zero. The transmitter-side communication library circuit 112a-112b does not store the Anti-Replay Count Low component in flash memory. Several (e.g., eight bytes) ensures that no rollover occurs during a session (e.g., allows 1 message every microsecond for approximately 9000 years).

The transmitter-side communication library circuit 112a-112b may derive a session key by generating a cipher block chain based message authentication code (CMAC) of the Anti-Replay Count High component with the low component set to zero. The circuits 102-104 are provisioned with a common MAC-generate key to derive the session key.

The transmitter-side communication library circuit 112a-112b increments the Anti-Replay Count Low component after each transmission request. If a receiver-side communication library circuit 112a-112b receives an Anti-Replay Count High component greater than stored value, a new session key is generated. The receiver-side communication library circuit 112a-112b stores the verified Anti-Replay Counts in RPMB flash periodically (e.g., 60 minutes) and at shutdown. The receiver-side communication library circuit 112a-112b accepts an Anti-Replay Count that is greater than the locally stored value and has a valid MAC.

The processing modules 110a-110b on the transmitter side provide the following information to the corresponding communication library circuit 112a-112b: Transmitter ID/Message ID; payload information (including a length and if the payload data is to be encrypted and protected by the MAC); if MB Byte is low (e.g., $00) then solely the Message ID, the Anti-Replay Counter, and a CRC check value are protected by the MAC; if MS Byte is high (e.g., $FF) then the header, parts of the payload data, and the CRC check value are protected by the MAC; other data is also encrypted to hide a CRC type and hide which parts of payload data are protected; a payload data Start Address; CRC information for payload data number of CRC segments, CRC information for payload data number of bytes per CRC chunk; protected data information for payload data number of protected segments; and protected data information for payload data number of protected bytes per segment. Other information may be provided to meet the criteria of a particular application.

Figure 3:
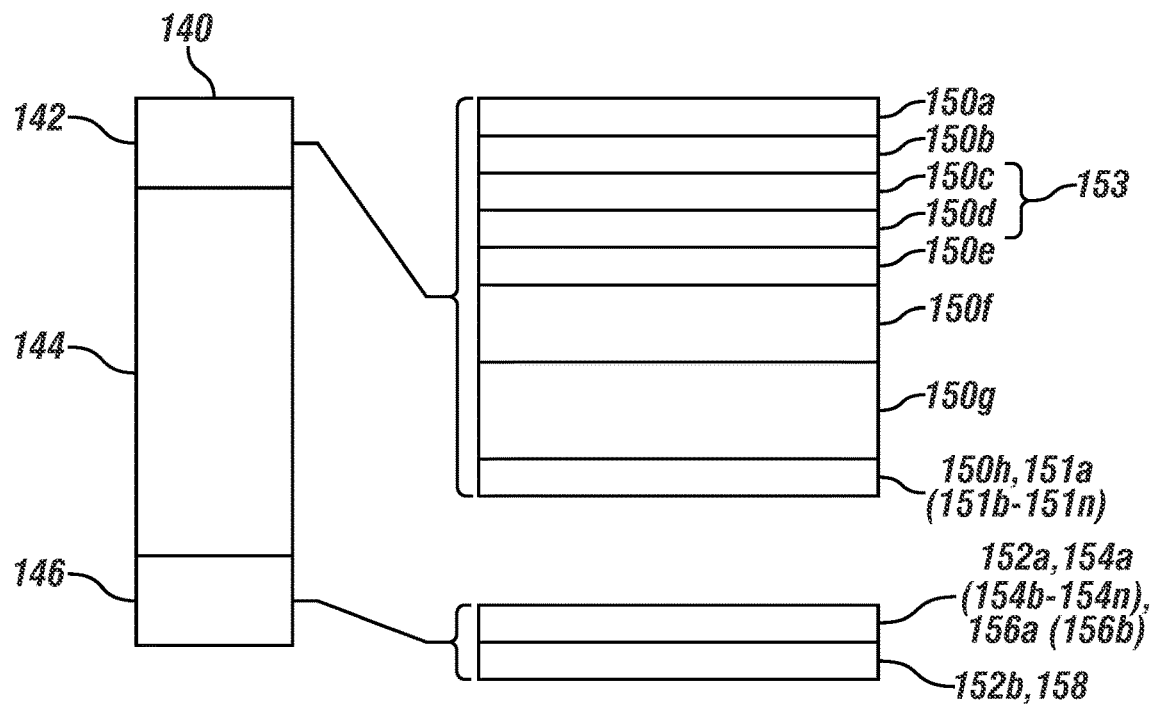
FIG. 3 is a schematic diagram of a first protection of a package accordance with one or more exemplary embodiments.

Referring to FIG. 3, a schematic diagram of a first example protection technique for a package 140 is shown in accordance with one or more exemplary embodiments. The package 140 includes a header 142, payload data 144, and a footer 146. The header 142 generally includes multiple header fields 150a-150h. The footer 146 includes multiple footer fields 152a-152b.

In various embodiments, the header field 150a contains the Transmitter ID/Message ID. The header field 150b contains payload information (e.g., payload length). The header field 150c contains the Anti-Replay Count High component. The Anti-Replay Count Low component is in header field 150d (e.g., the High component and the Low component combined form an anti-replay counter value 153). The header field 150e is generally encrypted when transmitted and may contain a CRC type, a direction, and a MAC type. The header field 150f is also encrypted when transmitted and contains a CRC start address, a CRC segment size, and a number of chunks per segment. The header field 150g is another field that is encrypted when transmitted and contains a protected data start address, a protected segment size, a number of protected segments, and a number of protected bytes per segment. The header field 150h may contain an encrypted obfuscation code 151a generated based on one or more obfuscation types 151b-151n used to protect the payload data 144. The obfuscation types 151b-151n may include, a check identifier 151b, a seed value 151c, an indication 151d of an encrypted cyclic redundancy check variant, and an encrypted random start point 151e. Other obfuscation types 151f-151n may be implemented to meet the design criteria of a particular application.

The footer field 152a is an encrypted field when transmitted and contains an encrypted particular CRC variant 154a version of the particular CRC variant 154b and an encrypted check value 156a version of the CRC check value 156b. The footer field 152b contains the MAC 158 (e.g., unencrypted).

In various implementations, a particular CRC variant 154b (e.g., CRC-32C) used to protect the integrity of the payload data 144 is randomly selected from multiple available CRC variants 154b-n. The random selection generally provides difficulties for an adversary to modify the data without detection. A bad actor sniffing the data would have trouble determining which particular CRC variant 154b was selected. Further protection is achieved by encrypting the check value 156b and either (i) encrypting the particular CRC variant 154b, as selected, or (ii) using a shared secret to derive a pseudo-random number (e.g., based on the anti-replay counter value 153) that allows the receiver to know which particular CRC variant 154b was used by the transmitter when the check value 156b was generated.

The communication library circuit 112a-112b on the transmitter does the following for each message transmission: uses a random number (RN) to calculate a protected data start address, CRC type (e.g., most-significant bit of random number), and a CRC start address. In various embodiments, the random number may be a cipher block chain based message authentication code (CMAC) of a particular byte (e.g., 16 byte) of the Anti-Replay Count. In other embodiments, the random number may be pre-generated.

In the following case, the total data is available to the communication library circuit 112a-112b before transmission of a packet on the communication bus 108 starts. A particular CRC variant 154b (e.g., CRC-32 or CRC-32C) may calculate a check value 156b over the payload data 144. In some embodiments, the CRC calculation may not start at the beginning of the payload data 144, rather start at a defined offset, and subsequently jump from segment to segment, and wrapping around the payload to cover the entire payload data 144. Randomly selected protected data, the segment length, the number of segments, the number of protected bytes per segment, the check value 156b, (optionally) padding, and CRC/MAC/Hash information may be encrypted (e.g., Advanced Encryption Standard-Cipher-Block Chaining with an initialization vector=Anti-Replay Count) and stored in the package 140. Thereafter, the Anti-Replay Count Low component may be incremented.

Figure 4:
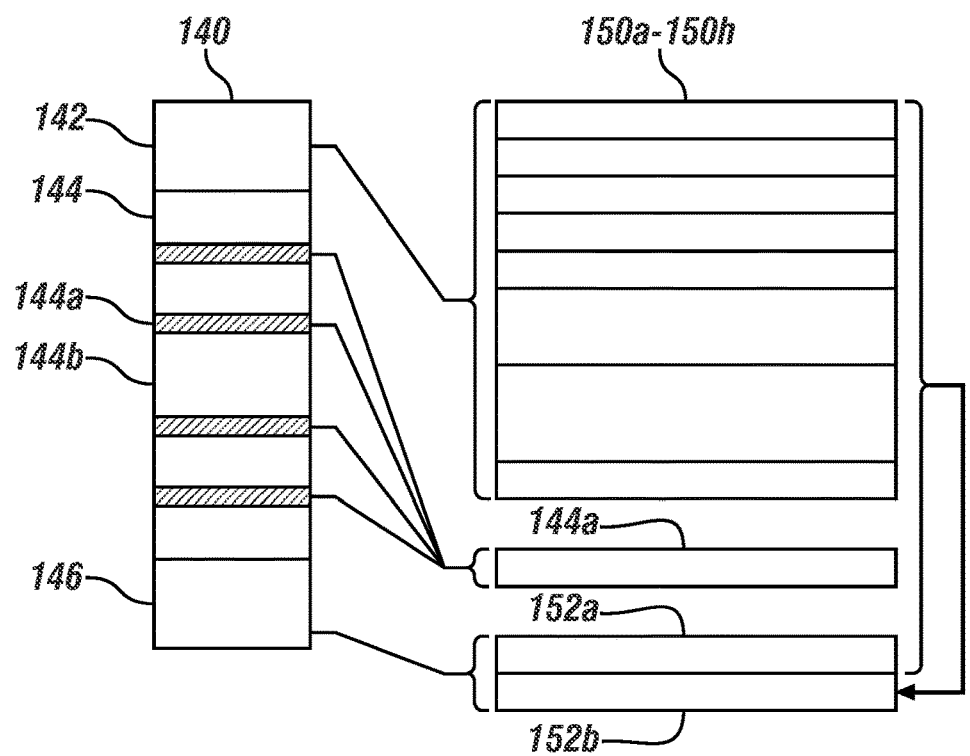
FIG. 4 is a schematic diagram of a second protection technique for the package in accordance with one or more exemplary embodiments.

Referring to FIG. 4, a schematic diagram of a second example protection technique for the package 140 is shown in accordance with one or more exemplary embodiments.

The payload data 144 may be logically parsed into protected data 144a and unprotected data 144b.

In the second example, parts of the payload data 144 are randomly selected to be protected with the MAC 158. Information regarding which parts are protected is encrypted and sent in the package 140. Randomly selecting parts of the transmitted payload data 144 to protect with the MAC 158 provides a configurable technique that allows as much data as possible to be protected without an unacceptable performance effect. Which parts of the payload data 144 are cryptographically protected is sent to the receiver in encrypted form to prevent a bad actor monitoring the traffic to know which parts of the payload data may be modified without detection.

A technique for protecting some of the payload data 144 with the MAC 158 may be as follows:
Payload length=X bytes;
Data payload is split into Y segments of Z bytes;
Y is configurable based on performance criterion. Y may be as large as practical;
Protect N bytes in each segment=protected data 144a (e.g., $N_{min}$=16 bytes);
Z=X/Y=segment length;
Start of segment 1=random number mod (segment length); and
Start of segment K=start of segment 1+(Z*K).

A single MAC 158 (e.g., AES128-CMAC) is generated over the header 142, the protected data 144a, and the footer 146, and each segment. Protecting header 142 with the MAC 158 generally protects the anti-replay counter value 153 and the Message ID from modification. Protecting the footer 146 with the MAC 158 protects the check value 156b from modification.

Figure 5:
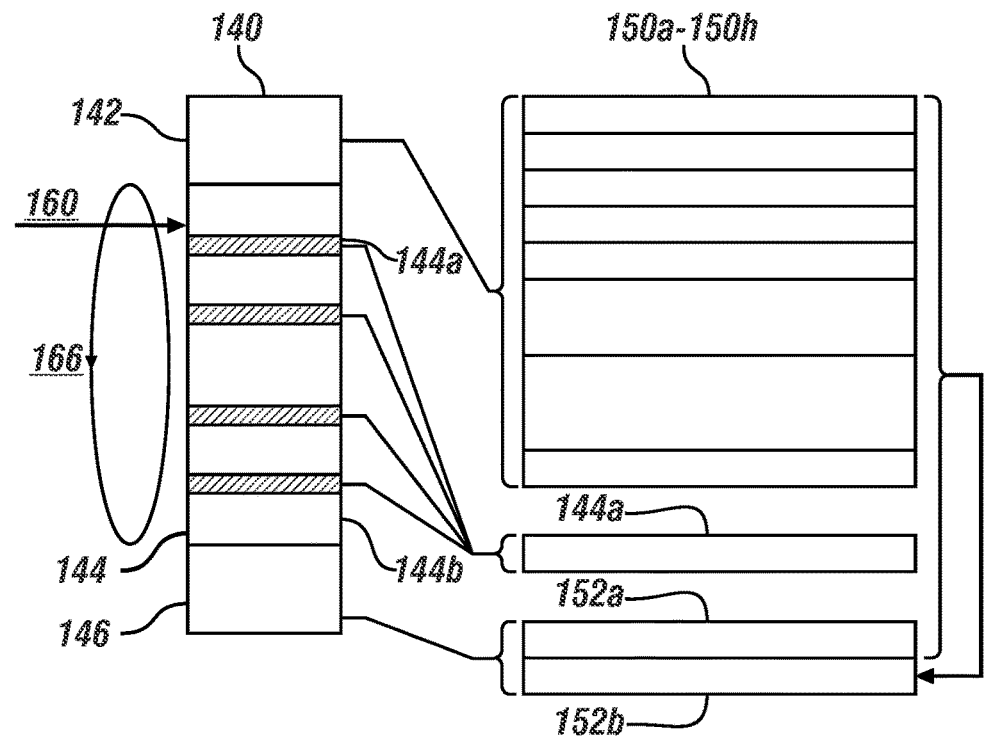
FIG. 5 is a schematic diagram of a third protection technique for the package in accordance with one or more exemplary embodiments.

Referring to FIG. 5 with references to FIG. 2, a schematic diagram of a third example protection technique for the package 140 is shown in accordance with one or more exemplary embodiments. In the third example, the CRC calculation 162 is started at a random start point 160 in the payload data 144. The random point 160 is kept secret by encryption prior to transmission in the package 140, or is generated by shared secret information in both the first circuit 102 and the second circuit 104.

Starting from the random start point 160 in the payload data 144, the CRC calculation 162 wraps around to cover the entire payload data 144. A bad actor sniffing the traffic on the communication bus 108 does not know where the CRC calculation 162 starts by encrypting the information or using a shared secret (e.g., a seed value 151c) to derive a pseudo-random number (e.g., based on the anti-replay counter) value 153 that allows the receiver to know where in the payload data 144 that the transmitter started the CRC calculation 162. In various embodiments, the seed value 151c may be known to both the first circuit 102 and the second circuit 104. In other embodiments, the seed value 151c may be incorporated into the encrypted obfuscation code 151a and stored in the header 142.

Figure 6:
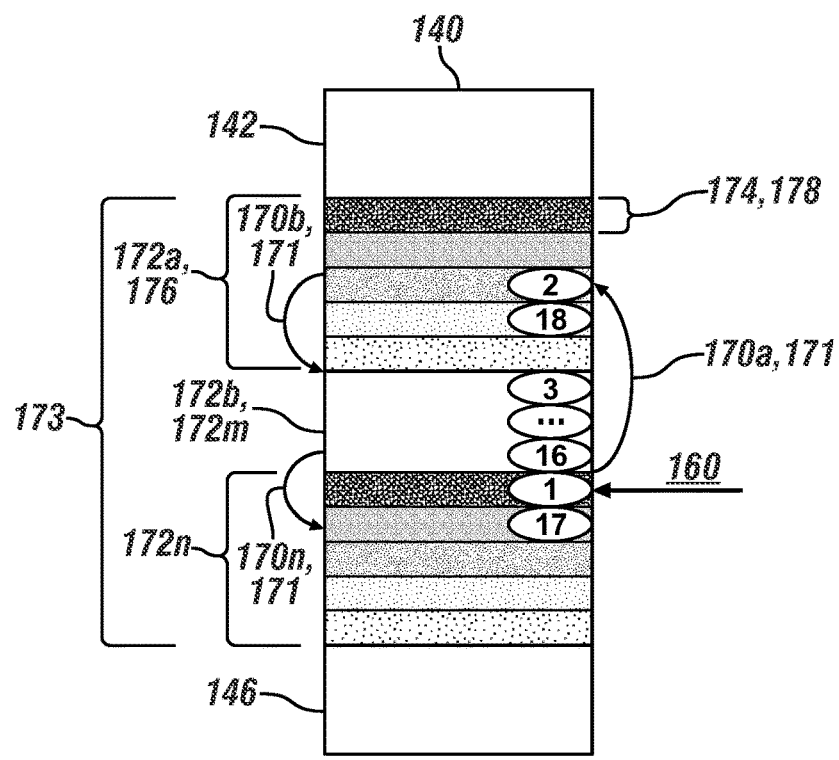
FIG. 6 is a schematic diagram of a fourth protection technique for the package in accordance with one or more exemplary embodiments.

Referring to FIG. 6 with references to FIG. 2, a schematic diagram of a fourth example protection technique for the package 140 is shown in accordance with one or more exemplary embodiments. The CRC calculation is obfuscated by jumping through the payload data 144 in intervals 170a-170n instead of performing the CRC calculation sequentially. For example, the intervals 170a-170n may be randomly selected to calculate the CRC that results in the entire payload data 144 being covered by the CRC calculation in a nonsequential path 171. The interval information is encrypted, stored in the package 140 (e.g., in the encrypted obfuscation code 151a), and transmitted.

The payload data 144 may occupy a payload size 173. The payload data 144 is split into X Segments 172a-172n. Each segment 172a-172n may be split into multiple CRC calculation chunks 174. The size of each chunk 174 is the number of bytes entered into the CRC calculation before jumping to the next chunk 174. The random start point 160 may be used as a starting location for CRC calculation. The transmitter side (e.g., the first circuit 102) provides the following to the receiver side (e.g., the second circuit 104) via the package 140: the CRC type, the CRC segment size 176, the CRC Chunk Size 178, and the check value 156b.

The following values are an example (e.g., the first 18 chunks 174 of the CRC calculation):
Payload Start Address (PSA);
Payload Size (PS)=1536 bytes;
Random Start (RS)=1456th byte of payload;
Chunks Per Segment (CPS)=6;
Segment Size (SS)=96 bytes;
Chunk Size (CS)=16 bytes;
Segments per Payload (SPP)=PS/SS=16; and
Bytes input to CRC each loop=Chunk Size (CS)=SS/CPS=16 bytes calculated at each step.

An example pseudocode for calculating the check value 156b over the initial several (e.g., 18) chunks of the payload data 144 may be as follows.

```
For (i=0; i<CPS; i++); /* Go through each segment the number of times
    there are chunks per segment */
{
    For<(j=0; j<SPP; j++); /* Go through the payload the
        number of segments per payload */
    {
        Calc_Address=PSA+RS+((j*SS)+(i*CS));
        If (Calc_Address>=PSA+PS); /* check if the pointer
            may wrapped around */
        {
            Calc_Address=Calc_Address–PS;
        }
        Cont_CRC_Calc(Calk_Address, CS);  /* continue
            the CRC calculation with the current chunk */
    }
}
```

The communication library circuit 112a-112b on the transmitter side may perform the following for each message transmission on the communication bus 108, use the random number (RN) to calculate and encrypt the random start point 160 and the CRC type (e.g., the most-significant bit of the random number). In some embodiments, the random number RN may be a CMAC of 16 byte Anti-Replay Count (ARC). In other embodiments, the random number RN may be pre-generated.

In situations where data for the package 140 is not entirely available when the transmission starts, the communication library circuit 112a-112b on the transmitter side may: encrypt the CRC/MAC/Hash information; encrypt the protected data 144a start; encrypt the segment length; encrypt the number of segments; and encrypt the protected segment length. The check value 156b may be calculated over the payload data 144 using a particular CRC variant 154b (e.g., CRC-32 or CRC-32C). The particular CRC variant 154b and the check value 156b are subsequently encrypted and stored in the package 140. A MAC 158 is then generated over the header 142, the protected data 144a, the particular CRC variant 154b, and the check value 156b. The Anti-Replay Count Low component may be incremented to indicate that the package 140 has been transmitted.

Figure 7:
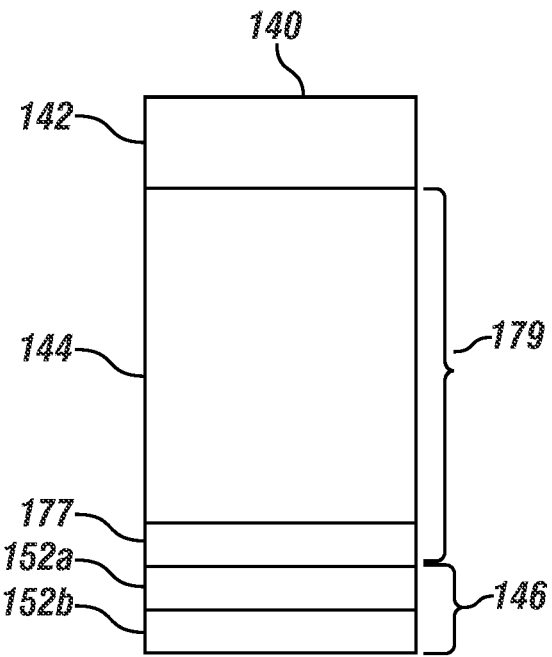
FIG. 7 is a schematic diagram of a fifth protection technique for the package in accordance with one or more exemplary embodiments.

Referring to FIG. 7 with references to FIG. 2, a schematic diagram of a fifth example protection technique for the package 140 is shown in accordance with one or more exemplary embodiments. An arbitrary encrypted random number 177 may be pended or prepended to the payload data 144 prior to calculation 179 of the check value 156b with the particular CRC variant 154b. The arbitrary bits of randomness; for example, a 6-byte random number appended to the data that is included in the CRC calculation generally introduces approximately 48 bits of randomness. Adding randomness to the CRC calculation combined with the MAC 158 calculation over a message reduces a risk of undetectable message modifications. In various embodiments, the arbitrary encrypted random number 177 may not be included in the package 140 when transmitted.

Figure 8:
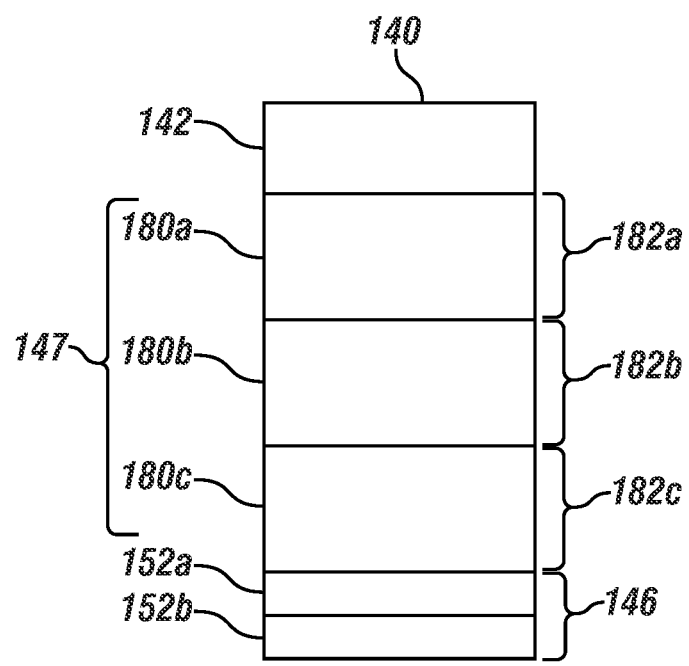
FIG. 8 is a schematic diagram of a sixth protection technique for the package in accordance with one or more exemplary embodiments.

Referring to FIG. 8, a schematic diagram of a sixth example protection technique for the package 140 is shown in accordance with one or more exemplary embodiments. Another protection technique is to have separate CRC calculations 182a-182c for contiguous data subsets 180a-180c (or partitions) of the payload data 144. For example, the subset 180a may be checked with a CRC-32 variant calculation 182a, the subset 180b may be checked with a CRC-32C variant calculation 182b, and so on. In various embodiments, the subsets 180a-180c are contiguous so that data integrity for the entire message may be verified in addition to security. The technique also increases the Hamming distance, which means more random errors may be detected in the data.

Figure 9:
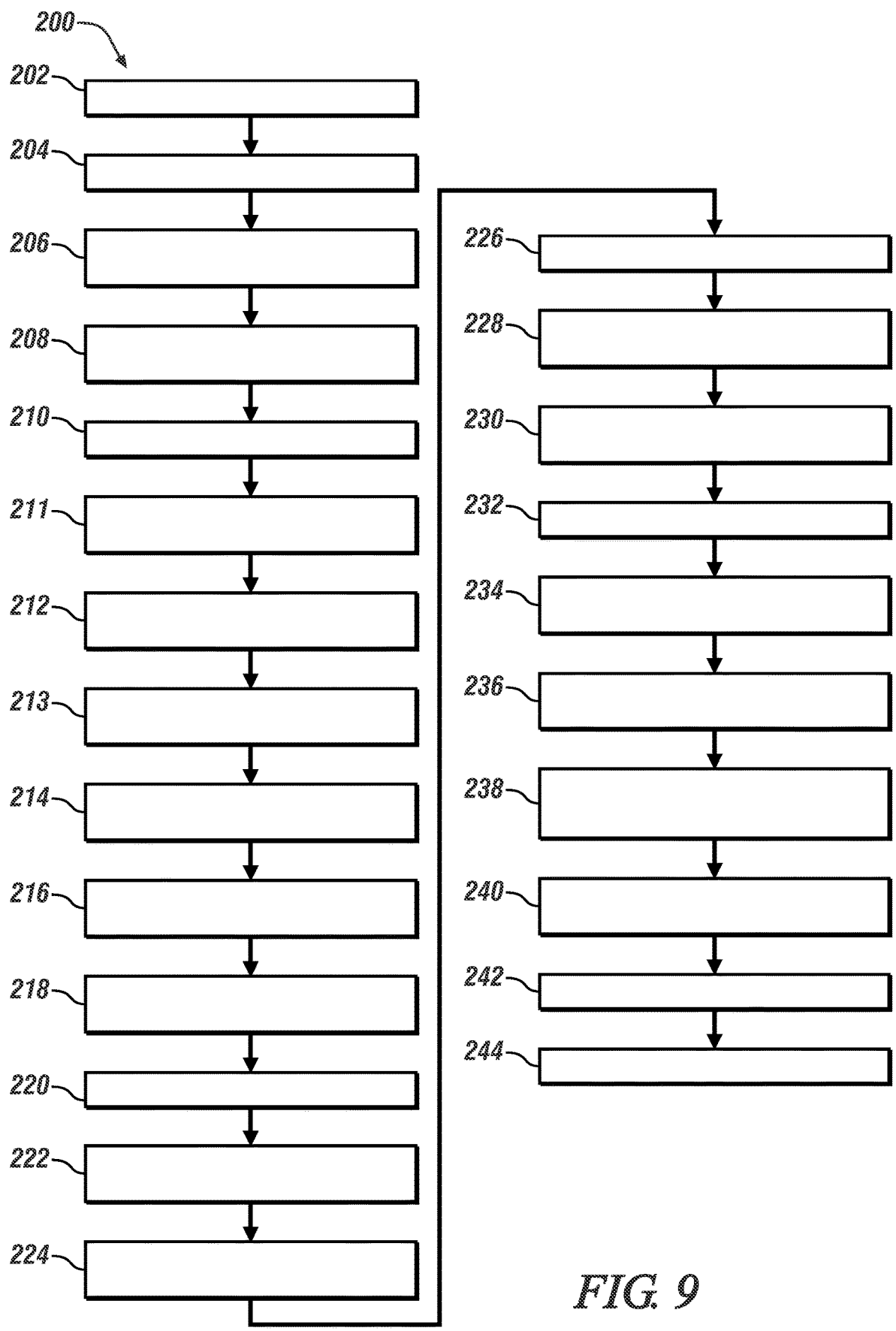
FIG. 9 is a flow diagram of a method for data integrity checking in accordance with one or more exemplary embodiments.
i.

Referring to FIG. 9, a flow diagram of an example method for data integrity checking is shown in accordance with one or more exemplary embodiments. The method 200 (or process) may be implemented with the electronic control unit 100. The method 200 generally includes steps 202 to 244, as illustrated. The sequence of steps is shown as a representative example. Other step orders may be implemented to meet the criteria of a particular application.

In the step 202, the transmitting circuit generates a package. The particular cyclic redundance check variant 154b is selected at random from multiple cyclic redundance check variants 154b-154n in the step 204. In various embodiments, the check identifier 151b of the particular cyclic redundance check variant 154b may be stored in the header 142 of the package 140 in the step 206.

In the step 208, a check value 156b of the payload data 144 may be calculated with the particular cyclic redundance check variant 154b. The check value 156b is encrypted in the step 210 to generate an encrypted check value 156a. The encrypted check value 156a may subsequently be stored in the footer 146 of the package 140 in the step 211. An encrypted obfuscation code 151a is generated in the step 212 based on the one or more obfuscation types 151b-151n currently applied. The encrypted obfuscation code 151a is stored in the header 142 in the step 213.

In the step 214, the payload data 144 may be logically partitioned into protected data 144a and unprotected data 144b. A message authentication code 158 is generated in the step 216 based on the header 142, the protected data 144a, and the encrypted check value 156a in the footer 146. Generation of the message authentication code 158 is done independent of the unprotected data 144b. The message authentication code 158 is stored in the footer 146 in the step 218.

In the step 220, a link layer level CRC is generated for the package 140 at the transmitting end (e.g., the first circuit end). The link layer CRC is calculated at the silicon level for link transmission and is independent of the encrypted check values 156a that protect the package data 148. The package 140 and link layer level CRC are transmitted in the step 222 on the communication bus 108 from the first circuit 102 to the second circuit 104. The package 140 is received at the second circuit 104 from the communication bus 108 in the step 224. The link layer level CRC is checked at the receiving end (e.g., the second circuit end) in the step 226.

If link layer level CRC passes the check, the payload data, the encrypted check value, the check identifier 151b, and the message authentication code 158 are extracted from the package 140 in the step 228. The check identifier 151b is used in the step 230 to uniquely associate the particular cyclic redundant check variant 154b used in the first circuit 102.

In the step 232, the encrypted check value 156a is decrypted to determine the check value 156b calculated by the first circuit 102. A first payload verification of the payload data 144 is performed in the second circuit 104 in the step 234 with the particular cyclic redundancy check variant 154b and the check value 156b. In response to passage of the first payload verification of the payload data 144, the second circuit 104 may signal in the output signal 86 that the payload data 144, as received, is valid in the step 236.

In the step 238, a second payload verification of the payload data 144 may be performed in the second circuit 104 with an additional cyclic redundancy check variant (e.g., 154c) and the check value 156b. In response to passage of the second payload verification of the payload data 144, the second circuit 104 may signal in the output signal 86 that the payload data 144, as received, is likely compromised in the step 240.

In the step 242, a package verification of the header 142, the protected data 144a, and an encrypted check value 156a may be performed in the second circuit 104 with the message authentication code 158 as extracted from the package 140. In response to passage of the package verification the second circuit 104 may signal in the output signal 86 that the package 140, as received, is valid in the step 244. Probable intentional modifications of the payload data 144 may be detected by checking if the particular CRC variant 154b of the payload data 144 or the MAC 158 checks fail after the unprotected CRC checks at the data link layer pass. Additional confidence that an intentional modification of the payload data 144 has been detected may be obtained by checking if a different CRC variant results in the correct payload CRC after the initial CRC check failed.

An Intrusion Detection System (IDS) technique may be applied as follows. An unprotected CRC is applied at the data link layer so data being processed in communication library circuit 112a-112b on the transmission side is typically free of bit flip errors. Therefore, an intentional modification by bad actor is assumed if the MAC verification fails. If the MAC verifies successfully but the CRC verification of the payload data fails, an intentional modification by the bad actor is also assumed.

If the MAC verifies successfully, the receiver stores the Anti-Replay Count value even if the CRC verification of the payload data fails to prevent the bad actor from retrying data modification with the same payload data. If the MAC verifies successfully but the CRC verification of the payload data fails, assume an intentional modification by the bad actor. If the CRC of the payload data verifies using another CRC variant (e.g., CRC-32 or CRC-32C) then more weight is given to the intentional modification assumption.

If there are greater than X intentional modification events from a transmitter during a single session, the receiver ignores messages from that transmitter until a next session. The failed reception events may be recorded and reported to the back office for investigation.

Various embodiments of the present disclosure provide circuitry and/or methodology that protects data transmitted at high rates in a configurable way to detect unauthorized modifications. The methods of protecting the data are able to be performed faster than protecting the entire set of data with a cryptographic MAC, allowing the data to be protected to varying degrees without an unacceptable effect on inter-circuit communication performance criterion. The varying degrees of protection achieved by implementing one or more of the following techniques.

Randomly selecting a CRC variant to verify the integrity of the transmitted data in a way that does not allow a bad actor sniffing the data to know which CRC variant was selected. Obfuscation of the selected CRC variant is achieved by encrypting the CRC and either encrypting the CRC variant or using a shared secret to derive a pseudo-random number (e.g., based on the anti-replay counter value 153) that allows the receiver to know which CRC variant was used by the transmitter when the CRC check value was generated.

Randomly selecting parts of the transmitted payload data to protect with a MAC in a configurable way allows as much data as possible to be protected by the MAC without an unacceptable effect on inter-circuit communication performance criterion. Which parts of the payload are cryptographically protected is sent to the receiver encrypted to prevent the bad actor monitoring the traffic to know which parts of the payload may be modified without detection.

Randomly selecting where the CRC calculation starts in the payload and having the CRC calculation wrap around to cover the entire payload. The bad actor sniffing the traffic is not allowed to know where the CRC calculation starts by encrypting the information or using a shared secret to derive a pseudo-random number (e.g., based on the anti-replay counter value 153) that allows the receiver to know where in the payload the transmitter started the CRC calculation.

Randomly selecting an interval to calculate the CRC that results in the entire payload being covered by the CRC calculation, but not sequentially. The interval information may be transmitted encrypted.

Random data is used to obfuscate the CRC calculation and hide which parts of the payload data are protected with a MAC. The random data is known by the transmitter and the receiver without actually sending the random data by creating a pseudo random number using both a shared secret and the anti-replay counter value that increments with each transmission.

Protecting the anti-replay counter value, message ID, message length, type of data protection, and CRC with a MAC helps prevent replay attacks, denial-of-service attacks, and malicious modification of the data in the package.

Detecting intentional modification of the data in the package by checking if the payload CRC and/or MAC checks fail after the unprotected CRC checks at the data link layer pass. Additional confidence in intentional modification of the payload data may be obtained by checking if a different CRC variant results in the correct payload CRC after the initial CRC check failed.

The data integrity checking generally allows for the authenticity of data transmitted at high rates to be verified in a configurable way that makes it difficult for an adversary to be able to modify data in a way that is not detectable by the receiving node(s). The solution is configurable, allowing a balance of security and performance to be attained. The data integrity checking also allows for detection of intentional modification of data by checking if the bad actor changes the data resulting in valid unprotected CRCs at the data link layer but invalid MAC checks and/or CRC checks at the application layer. Furthermore, the data integrity checking allows for detection of intentional modification of the data in the package by checking if the bad actor changed the data in the package to get a valid CRC using the wrong CRC variant.

Numerical values of parameters (e.g., of quantities or conditions) in this specification, including the appended claims, are to be understood as being modified in instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and with such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus comprising:
   a communication bus;
   a first circuit coupled to the communication bus, and operational to:
   generate a package that includes a header, payload data, and a footer;
   calculate a check value of the payload data with a particular cyclic redundancy check variant and an obfuscation type, wherein the obfuscation type is one or more of (i) a random selection of the particular cyclic redundancy check variant from among a plurality of cyclic redundancy check variants, (ii) a random start point in the payload data for the calculation, (iii) the calculation of the check value is performed over a nonsequential path through the payload data, (iv) incorporate a random number into the calculation of the check value, and (v) calculate the check value with two or more particular cyclic redundancy check variants each working on a respective subset of the payload data;
   generate an encrypted check value from the check value;
   store the encrypted check value in the footer of the package;
   generate an encrypted obfuscation code for the obfuscation type;
   store the encrypted obfuscation code in the header of the package; and
   transmit the package on the communication bus; and
   a second circuit coupled to the communication bus, and operational to:
   receive the package from the communication bus;
   extract the payload data, the encrypted check value, and the encrypted obfuscation code from the package;

decrypt the encrypted check value to determine the check value calculated by the first circuit;

determine the obfuscation type from the encrypted obfuscation code;

perform a payload verification of the payload data with the particular cyclic redundancy check variant with the obfuscation type applied and the check value; and signal that the payload data is valid in response to passage of the payload verification.

2. The apparatus according to claim 1, wherein the obfuscation type includes (i) a random selection of the particular cyclic redundancy check variant from among a plurality of cyclic redundancy check variants, (ii) a random start point in the payload data for the calculation, (iii) the calculation of the check value is performed over a nonsequential path through the payload data, (iv) incorporate a random number into the calculation of the check value, and (v) calculate the check value with two or more particular cyclic redundancy check variants each working on a respective subset of the payload data.

3. The apparatus according to claim 1, wherein:
the obfuscation type is the random selection of the particular cyclic redundancy check variant;
the first circuit is operational to encrypt the particular cyclic redundancy check variant to generate an encrypted cyclic redundancy check variant;
the encrypted obfuscation code indicates the encrypted cyclic redundancy check variant; and
the second circuit is operational to decrypt the encrypted cyclic redundancy check variant to determine the particular cyclic redundancy check variant selected by the first circuit.

4. The apparatus according to claim 1, wherein:
the obfuscation type is the random selection of the particular cyclic redundancy check variant;
the encrypted obfuscation code includes a check identifier of the particular cyclic redundancy check variant; and
the second circuit uniquely associates the check identifier with the particular cyclic redundancy check variant from among a plurality of cyclic redundancy check variants.

5. The apparatus according to claim 1, wherein:
the obfuscation type is the random start point in the payload data for the calculation;
the first circuit is operational to encrypt the random start point to generate an encrypted random start point;
the encrypted obfuscation code includes the encrypted random start point;
the second circuit is operational to decrypt the encrypted random start point to determine the random start point used by the first circuit; and
the payload verification is based on the random start point.

6. The apparatus according to claim 1, wherein:
the obfuscation type is the random start point in the payload data for the calculation;
the first circuit is operational to determine the random start point based on a seed value;
the encrypted obfuscation code includes the seed value;
the second circuit is operational to calculate the random start point from the seed value;
the payload verification is based on the random start point; and
the seed value is known to the first circuit and the second circuit.

7. The apparatus according to claim 1, wherein:
the obfuscation type is the calculation of the check value performed over the nonsequential path through the payload data;
the payload data is logically formed from a first number of segments;
each of the first number of segments is logically formed from a second number of chunks;
the nonsequential path jumps among the first number of segments and the second number of chunks in a pattern;
the encrypted obfuscation code includes the random start point, the first number of segments, and the second number of chunks;
the second circuit is operational to determine the first number of segments, and the second number of chunks from the encrypted obfuscation code;
the payload verification is based on the first number of segments and the second number of chunks; and
the pattern in known to the first circuit and the second circuit.

8. The apparatus according to claim 1, wherein:
the obfuscation type is the calculation of the check value performed over the nonsequential path through the payload data;
the first circuit is operational to:
randomly determine an interval;
encrypt the interval to generate an encrypted interval; and
store the encrypted interval in the header, wherein the nonsequential path through the payload data used by the particular cyclic redundancy check variant in the first circuit skips through the payload data at the interval; and
the second circuit is operational to:
extract the encrypted interval from the package;
decrypt the encrypted interval to determine the interval used by the first circuit;
perform the payload verification of the payload data with the particular cyclic redundancy check variant, the check value, and the interval; and
the payload verification is based on the interval.

9. The apparatus according to claim 1, wherein:
the obfuscation type is by incorporation of a random number into the calculation of the check value;
the first circuit is operational to:
generate the random number; and
store the random number in the package; and
the second circuit is operational to:
extract the random number from the package; and
perform the payload verification of the payload data with the particular cyclic redundancy check variant, the check value, and the random number.

10. The apparatus according to claim 1, wherein:
the obfuscation type is to calculate the check value with two or more particular cyclic redundancy check variants each working on a respective subset of the payload data;
the first circuit is operational to:
determine the two or more particular cyclic redundancy check variants from among the plurality of cyclic redundancy check variants;
parse the payload data into two or more subsets;
calculate two or more intermediate check values, each based on one of the two or more particular cyclic redundancy check variants working on the respective subset of the payload data; and append the two or more intermediate check values to form the check value; and the second circuit is operational to:

parse the payload data into the two or more subsets;

parse the check value into the two or more intermediate check values; and perform the payload verification of the payload data with the two or more particular cyclic redundancy check variants and the two or more intermediate check values.

11. The apparatus according to claim 1, wherein:

the first circuit is operational to:

store an anti-replay counter value, a message identifier value, a message length value, and a type of data protection in the header;

generate a message authentication code based on the header and the encrypted check value in the footer; and store the message authentication code in the footer; and the second circuit is operational to:

extract the message authentication code from the package;

perform a package verification of the package with the message authentication code; and signal that the package is valid in response to passage of the package verification.

12. The apparatus according to claim 1, further comprising:

a vehicle; and an electronic control unit inside the vehicle, wherein the communication bus is a peripheral component interconnect express bus inside the electronic control unit.

13. The apparatus according to claim 1, wherein:

the first circuit is operational to:

logically partition the payload data into protected data and unprotected data;

generate a message authentication code based on the header, the protected data, and an encrypted check value in the footer, wherein the message authentication code is generated independent of the unprotected data; and store the message authentication code in the footer; and the second circuit is operational to:

extract the message authentication code from the package;

perform a package verification of the header, the protected data, and an encrypted check value with the message authentication code; and signal that the package is valid in response to passage of the package verification.

14. An apparatus comprising:

a communication bus;

a first circuit coupled to the communication bus, and operational to:

generate a package that includes a header, payload data, and a footer;

logically partition the payload data into protected data and unprotected data;

generate a message authentication code based on the header, the protected data, and an encrypted check value in the footer, wherein the message authentication code is generated independent of the unprotected data;

store the message authentication code in the footer;

transmit the package on the communication bus; and a second circuit coupled to the communication bus, and operational to:

receive the package from the communication bus;

extract the message authentication code from the package;

perform a package verification of the header, the protected data, and an encrypted check value with the message authentication code; and signal that the package is valid in response to passage of the package verification.

15. The apparatus according to claim 14, wherein:

the first circuit is operational to:

increment an anti-replay counter value in response to each of a plurality of transmissions to the communication bus;

generate a pseudo random value based on the anti-replay counter value and a seed value, wherein the logical partition of the payload data is based on the pseudo random value, and a particular cyclic redundancy check variant of a plurality of redundancy check variants is selected based on the pseudo random value;

calculate a protected check value of the protected data with the particular cyclic redundancy check variant;

encrypt the protected check value to generate an encrypted protected check value; and store the anti-replay counter value and the encrypted protected check value in the header of the package;

the second circuit is operational to:

extract the anti-replay counter value and the encrypted protected check value from the header;

decrypt the encrypted protected check value to determine the protected check value calculated by the first circuit;

generate the pseudo random value used in the first circuit based on the anti-replay counter value and the seed value;

determine the particular cyclic redundancy check variant used by the first circuit based on the pseudo random value;

perform a payload verification of the protected data with the particular cyclic redundancy check variant and the protected check value; and signal that the payload data is valid in response to passage of the payload verification; and the seed value is known to the first circuit and the second circuit.

16. The apparatus according to claim 14, wherein:

the first circuit is operational to:

calculate a check value of the payload data with a particular cyclic redundancy check variant;

encrypt the check value to generate an encrypted check value; and store the encrypted check value in the package;

the second circuit is operational to:

perform an unprotected cyclic redundancy check of the package at a link layer level of the communications bus;

extract the encrypted check value from the package in response to passage of the unprotected cyclic redundancy check at the link layer level;

decrypt the encrypted check value to determine the check value;

perform a payload verification of the payload data with the particular cyclic redundancy check variant and the check value; and signal corruption in the payload data in response to failure of the payload verification.

17. The apparatus according to claim 14, wherein the second circuit is operational to:

perform an unprotected cyclic redundancy check of the package at a link layer level of the communications bus;

wherein the extraction of the message authentication code from the package is in response to passage of the unprotected cyclic redundancy check at the link layer level; and signal corruption in the package in response to failure of the package verification.

18. The apparatus according to claim 14, wherein:

the first circuit is operational to:

randomly select a particular cyclic redundancy check variant from among a plurality of cyclic redundancy check variants;

store an identification of the particular cyclic redundancy check variant in the header of the package;

calculate a check value of the payload data with the particular cyclic redundancy check variant;

encrypt the check value to generate an encrypted check value; and store the encrypted check value in the footer of the package; and the second circuit is operational to:

extract the encrypted check value and the identification of the particular cyclic redundancy check variant from the package;

decrypt the encrypted check value to generate the check value;

perform a first payload verification of the payload data with the particular cyclic redundancy check variant and the check value;

select an additional cyclic redundancy check variant from the plurality of cyclic redundancy check variants in response to failure of the first payload verification;

perform a second payload verification of the payload data with the additional cyclic redundancy check variant and the check value; and signal a compromise of the payload data in response to passage of the second payload verification.

19. A method for data integrity checking between circuits comprising:

generating a package with a first circuit, wherein the package includes a header, payload data, and a footer;

selecting a particular cyclic redundancy check variant at random from a plurality of cyclic redundancy check variants;

storing a check identifier of the particular cyclic redundancy check variant in the header of the package;

calculating a check value of the payload data with the particular cyclic redundancy check variant;

encrypting the check value to generate an encrypted check value;

storing the encrypted check value in the footer of the package;

partitioning logically the payload data into protected data and unprotected data;

generating a message authentication code based on the header, the protected data, and the encrypted check value in the footer, wherein the message authentication code is generated independent of the unprotected data;

storing the message authentication code in the footer;

transmitting the package on a communication bus from the first circuit;

receiving the package at a second circuit from the communication bus;

extracting the payload data, the encrypted check value, the check identifier, and the message authentication code from the package;

determining the particular cyclic redundant check variant used in the first circuit with the check identifier;

decrypting the encrypted check value to determine the check value calculated by the first circuit;

performing a payload verification of the payload data in the second circuit with the particular cyclic redundancy check variant and the check value;

signaling that the payload data is valid in response to passage of the payload verification;

performing a package verification of the header, the protected data, and an encrypted check value in the second circuit with the message authentication code; and signaling that the package is valid in response to passage of the package verification.

20. The method according to claim 19, wherein the partitioning of the payload data is based on an inter-circuit communications performance criterion of the package.

* * * * *